United States Patent [19]

Nakamura, Shoichi et al.

[11] 3,752,934

[45] Aug. 14, 1973

[54] STEREO DEMODULATING CIRCUIT TRIGGERED BY A MINIMUM INPUT SIGNAL LEVEL

[76] Inventors: Nakamura, Shoichi, 408, Fushimido, Tondabayashi; Nada, Naohiro, 4-15, Sakuradanicho, Nishinomiya-shi; Okubo, Tsuneo, 1642-7, Oaza Kisaichi, Katanocho, Kitakawachi-gun, all of Japan

[22] Filed: Dec. 17, 1970

[21] Appl. No.: 99,069

[30] Foreign Application Priority Data

| | | |
|---|---|---|
| Dec. 19, 1969 | Japan | 44/103154 |
| Dec. 19, 1969 | Japan | 44/103155 |
| Dec. 19, 1969 | Japan | 44/103156 |
| Dec. 19, 1969 | Japan | 44/103157 |
| Dec. 19, 1969 | Japan | 44/103158 |
| June 6, 1970 | Japan | 45/48819 |
| June 6, 1970 | Japan | 45/48820 |
| June 6, 1970 | Japan | 45/48821 |
| June 6, 1970 | Japan | 45/48822 |

[52] U.S. Cl. .............................. 179/15 BT

[51] Int. Cl. .............................. H04h 5/00

[58] Field of Search ................. 179/15 BT; 325/401, 325/348, 402, 408, 456, 469, 478

[56] References Cited

UNITED STATES PATENTS

| | | | |
|---|---|---|---|
| 3,573,382 | 4/1971 | Feit | 179/15 BT |
| 3,569,633 | 3/1971 | Brahman | 179/15 BT |
| 3,519,846 | 7/1970 | Bacci | 179/15 BT |
| 3,584,154 | 6/1971 | McShan | 179/15 BT |
| 3,384,716 | 5/1968 | Takano | 179/15 BT |

*Primary Examiner*—Kathleen H. Claffy
*Assistant Examiner*—Thomas D'Amico
*Attorney*—Stevens, Davis, Miller & Mosher

[57] ABSTRACT

An FM stereo receiver having a composite signal circuit, a circuit for producing a 38-kHz switching carrier from a 19-kHz pilot signal, a demodulating circuit, a positive feedback amplifier, means for maintaining the stereo-on level constant irrespective of any variation in the power supply voltage and ambient temperature, means connected to the positive feedback amplifier for turning on and off a stereo lamp while, at the same time, turning on and off the 38-kHz switching carrier, and means for applying a first composite signal of one phase and a second composite signal of opposite phase to a first and a second composite signal amplifier in the demodulating circuit respectively and varying the level of the input to the second composite signal amplifier for improving the stereo separation.

18 Claims, 8 Drawing Figures

STEREO DEMODULATING CIRCUIT TRIGGERED BY A MINIMUM INPUT SIGNAL LEVEL

This invention relates to an apparatus for the reproduction of a stereophonic broadcast upon receiving a signal including an audio frequency signal corresponding to the sum of a pair of signals which are in stereophonic relationship with each other, sidebands of a suppressed subcarrier modulated by the difference between the pair of signals which are in the stereophonic relationship with each other, and a pilot signal the frequency of which is one-half of the frequency of the subcarrier. The apparatus includes a composite signal circuit, a circuit for producing a 38-kHz switching carrier by multiplying the frequency of the 19-kHz pilot signal, and demodulating circuit means for the stereophonic reproduction of the signal in response to the output from the composite signal circuit and the output from the circuit producing the 38-kHz switching carrier. The apparatus includes further a circuit for the automatic stereophonic-monaural switchover, a monaural muting circuit and a stereo indicator circuit. The demodulating circuit means includes a first and a second output terminal for deriving the respective signals which are in the stereophonic relationship, and these output terminals are connected to a pair of sound reproducing means respectively.

A variety of stereo receivers of this kind have been developed heretofore, but they have involved many problems which have to be remedied. These problems include the need for additional provision of complex electrical circuits or mechanical means for carrying out the automatic stereophonic-monaural switch-over, the possibility that the stereo lamp would not be energized when a weak stereophonic input signal is received and the reproduction of the stereophonic signal takes place actually, the large distortion occurring in a monaural audible signal of relatively high frequencies due to the generation of a switching carrier in response to the receiving of such a monaural audible signal, the undesirable energization of the stereo lamp due to interstation noises appearing in the detuned state, and the undesirable variation in the stereo-on level due to a variation in the power supply voltage or ambient temperature.

The present invention contemplates the provision of an FM stereo receiver which is free from all the defects described above. It is an object of the present invention to provide an FM stereo receiver which includes a simple additional electrical circuit for easily realizing the desired automatic monaural-stereophonic switch over and monaural muting.

Another object of the present invention is to provide an FM stereo receiver which is provided with means for energizing the stereo lamp as soon as the stereo operation is started and preventing the stereo lamp from being energized when no stereo operation is carried out.

Still another object of the present invention is to provide an FM stereo receiver by which the undesirable distortion of a monaural signal can be substantially eliminated.

A further object of the present invention is to provide an FM stereo receiver which is provided with means for preventing the stereo lamp from being energized due to large inter-station noises appearing in the detuned state.

A still further object of the present invention is to provide an FM stereo receiver which is provided with means for maintaining the stereo-on level constant irrespective of any variation in the power supply voltage or ambient temperature.

A yet further object of the present invention is to provide a circuit which is suitable for integration into an integrated circuit.

The above and other objects, features and advantages of the present invention will be apparent from the following detailed description taken in conjunction with the accompanying drawings, in which.

Figure 1:
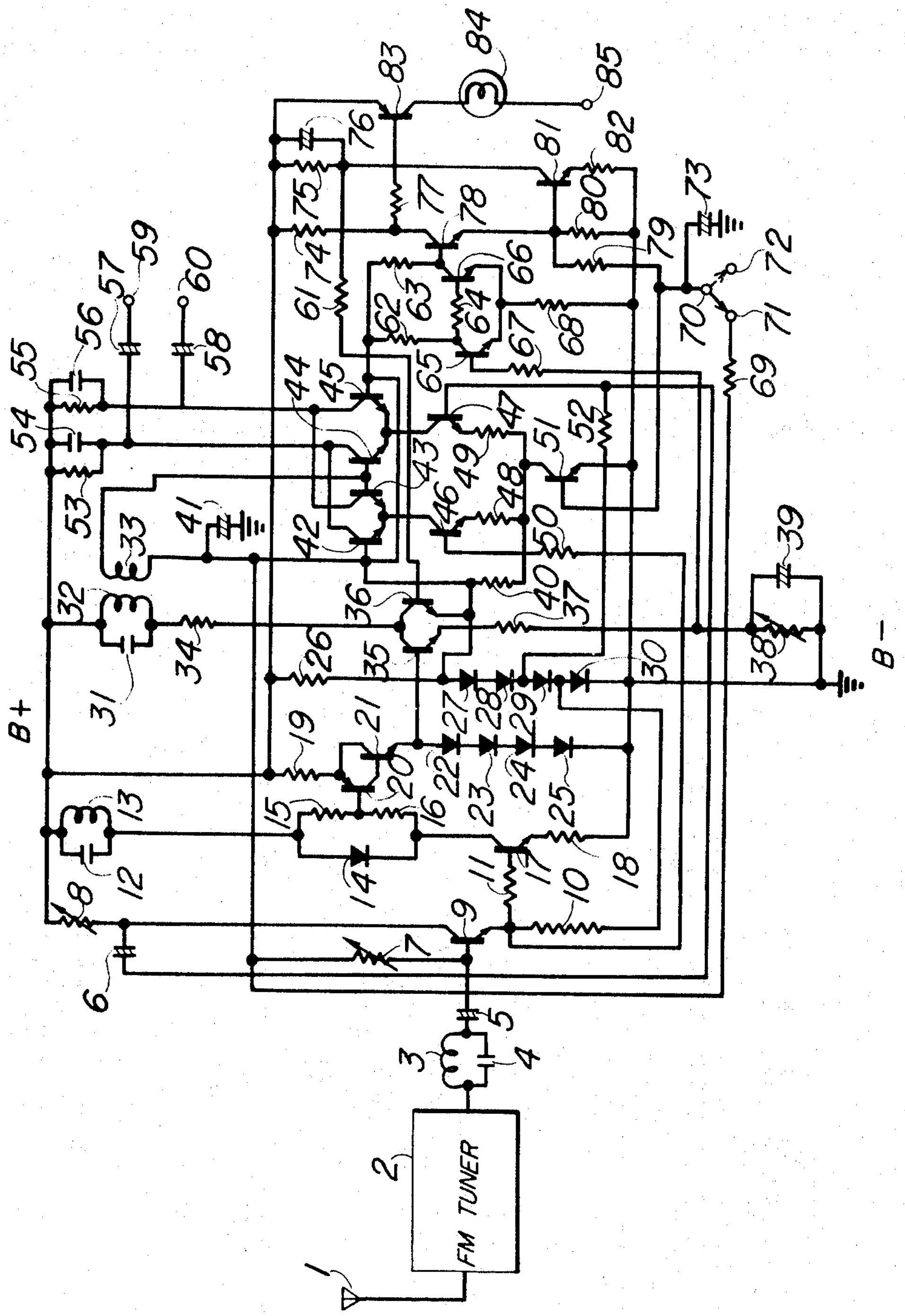
FIG. 1 is a circuit diagram of an FM stereo receiver embodying the present invention.

At first, the general structure of an FM stereo receiver according to the present invention will be described with reference to FIG. 1.

An FM stereophonic broadcast signal is received by an antenna 1 and is applied to an FM tuner 2 to be detected thereby. The composite stereophonic signal obtained after the detection is passed through an SCA filter composed of a coil 3 and a capacitor 4 for the removal of the SCA signal which is unnecessary for the stereophonic reproduction. The signal is then passed through an electrolytic capacitor 5 to be applied to the base of a transistor 9 to be amplified thereby. A base resistor 7, a collector resistor 8 and an emitter resistor 10 are provided for the transistor 9. After the composite stereophonic signal is amplified by the transistor 9, a first composite signal is derived from one end of the emitter resistor 10 for the transistor 9 and is applied through a resistor 50 to the base of a transistor 46 to appear at an output terminal 59 or 60 through a switching transistor 42 or 43 and an electrolytic capacitor 57 or 58. On the other hand, a second composite signal having a phase opposite to that of the first composite signal is derived from one end of the collector resistor 8 for the transistor 9 and is applied through an electrolytic capacitor 6 to the base of a transistor 47 to appear at the output terminal 59 or 60 through a switching transistor 44 or 45 and the electrolytic capacitor 57 or 58. The base bias for the transistor 47 is applied from a diode 29 through a resistor 52, and the variable resistor 7 connected to the base of the transistor 9 is suitably adjusted to establish a balance between the base bias for the transistor 47 and the base bias for the transistor 46 thereby to minimize the carrier leakage. The second composite signal is applied so as to cancel any crosstalk signal components thereby to improve the stereo separation.

The 19-kHz pilot signal in the composite stereophonic signal is applied to the base of a transistor 17 through the emitter of the transistor 9 and a resistor 11 to be subject to selective amplification by the transistor amplifier 17 and a 19-kHz tuner composed of a coil 13 and a capacitor 12. The 19-kHz pilot signal subjected to the selective amplification is subject to half-wave rectification by a half-wave rectifier composed of transistors 20 and 21 of Darlington connection. A diode 14 and resistors 15 and 16 are provided to apply a suitable base bias to the transistor 20, and a resistor 18 acts as an emitter resistor for the transistor 17, while a resistor 19 acts as an emitter resistor for the transistor 20, and at the same time, as a collector resistor for the transistor 21. Due to the application of the half-wave rectified 19-kHz signal to a series of diodes 22 to 25 connected to the emitter of the transistor 21, a d.c. voltage appears across the diodes 22 to 25 and this voltage is applied to the base of a transistor 35 so that the transistor 35 conducts. The half-wave rectified 19-kHz signal amplified by the transistor 35 is passed through a resistor 34 connected to the collector of the transistor 35 to be converted into a 38-kHz switching carrier by a 38-kHz tuner composed of a coil 32 and a capacitor 31. This 38-kHz switching carrier is applied through a secondary coil 33 to the switching circuit composed of the transistors 42 to 45.

The operation of a demodulating circuit will next be described. One end of the coil 33 is connected to the base of the transistors 43 and 44, while the other end thereof is connected to the base of the transistors 42 and 45. A constant bias is applied to the base of the transistors 42 and 45 by a constant-voltage circuit composed of a resistor 26 and a series of diodes 27 to 30. When now the 38-kHz switching carrier appears across the coil 33 and the base voltage of the transistors 43 and 44 is thereby increased, the emitter voltage of the transistors 43 and 44 is correspondingly increased, and at the same time, the emitter voltage of the transistors 42 and 45 is increased due to the fact that the emitters of the transistors 42 and 45 are connected to the emitters of the transistors 43 and 44 respectively. The transistors 42 and 45 are cut off since the constant bias voltage is applied to the base of these transistors 42 and 45. That is, the transistors 42 and 45 are cut off when the transistors 43 and 44 conduct, while the transistors 42 and 45 conduct when the transistors 43 and 44 are cut off. It will thus be seen that the transistors 43 and 44 are simultaneously switched to the conducting or non-conducting state depending on the polarity of the 38-kHz switching carrier, while the other set of the transistors 42 and 45 is simultaneously switched to the conducting or non-conducting state in a relation opposite to that of the transistors 43 and 44.

Consider now the R signal for the right-hand reproducing system. When the transistors 46 and 42 are driven by the inputs of the same phase, a signal which is the product of the composite signal of one phase and the rectangular waveform signal synchronous with the composite signal appears at the collector of the transistor 42 through a resistor 53 and a capacitor 54 by the action of the transistors 46 and 42. Further, a signal which is the product of the composite signal of opposite phase and the rectangular waveform signal synchronous with the composite signal appears similarly due to the operation of the transistors 47 and 44, at the collector of the transistor 42. Therefore, an output which is the sum of these two signals appears at the output terminal 59 through the electrolytic capacitor 57. The capacitor 54 is a bypass capacitor for the rectangular waveform signal. As described previously, the variable resistor 8 connected to the collector of the transistor 9 may be suitably adjusted to control the magnitude of the composite signal of opposite phase thereby cancelling any crosstalk signal components for improving the stereo separation. On the other hand, the L signal for the left-hand reproducing system appears at the output terminal 60 through an operation similar to that above described by the action of the transistors 46, 43 and transistors 47, 45. In this manner, the FM stereophonic signal is separated into the R and L signals. A resistor 40 is provided to ensure sufficient flow of collector current of a switching transistor 51 so as thereby to prevent an undesirable reduction in the stereo separation due to a variation in the power supply voltage.

Due to the application of the half-wave rectified 19-kHz signal, a d.c. voltage appears across a variable resistor 38 and an electrolytic capacitor 39 connected to the emitter of the transistor 35. This d.c. voltage is utilized to energize a stereo lamp 84, to urge the switching transistor 51 to conduct, and to cut off a shorting transistor 36. An emitter resistor 37 for the transistor 35 is provided so that the 38-kHz switching carrier appearing across the coil 32 and the capacitor 31 may not be distorted even with a large stereophonic signal input. The magnitude of the d.c. voltage appearing across the variable resistor 38 and the electrolytic capacitor 39 can be suitably varied by adjusting the variable resistor 38. When the d.c. voltage appearing across the variable resistor 38 and the electrolytic capacitor 39 in response to the receiving of the stereophonic signal exceeds a predetermined limit, a transistor 65 conducts and a positive feedback amplifier circuit composed of transistors 65, 66 and 78 and resistors 62, 63, 64 and 68 operates so that the transistors 78 and 81 conduct. As a result of the conduction of the transistor 78, a d.c. voltage appears across a collector resistor 74 for the transistor 78, and this voltage is applied to the base of a transistor 83 through a resistor 77 thereby urging the transistor 83 to conduct and energizing the stereo lamp 84. Further, the conduction of the transistor 78 results in appearance of a d.c. voltage across a resistor 80, and this voltage is applied to the base of the switching transistor 51 thereby urging the transistor 51 to conduct. The conduction of the transistor 81 results in appearance of a d.c. voltage across a resistor 75 and an electrolytic capacitor 76, and this voltage is applied to the base of the transistor 36 through a resistor 61 so that the transistor 36 is cut off. When the transistor 36 is cut off, the 38-kHz switching carrier appears across the coil 32 and the capacitor 31 through the transistor 35.

The monaural muting and automatic monaural-stereophonic switch-over can be carried out by the on-off operation of the switching transistor 51 above described. When a monaural signal is received in the state in which contacts 70 and 72 engage each other in a change-over switch including the contacts 70, 71 and 72, the demodulating circuit does not operate and the monaural signal does not appear at the output terminals due to the fact that the transistor 51 is in the cut-off state. When a stereophonic signal the level of which is higher than a predetermined input level is received in the above position of the change-over switch, the d.c. voltage appearing across the variable resistor 38 and the electrolytic capacitor 39 due to the 19-kHz pilot signal in the stereophonic signal is utilized to urge the transistor 65 to conduct, hence to urge the transistor 51 to conduct and to cut off the transistor 36. The 38-kHz switching carrier is generated thereby and the demodulating circuit is placed in the condition of stereo operation so that the stereophonic signal of the level higher than the predetermined input level can be derived from the output terminals. In the case of a stereophonic signal the level of which is lower than the predetermined input level, the tansistor 65 remains in the cut-off state, and therefore the transistor 51 is cut off while the transistor 36 conducts. Thus, the stereophonic signal of the level lower than the predetermined input level cannot be derived from the output terminals. An unusual sound may be delivered from the speakers due to the on-off of the transistors 51 and 36. However, this unusual sound can be substantially removed by virtue of the provision of the capacitors 73 and 76 in the base circuits of the respective transistors 51 and 36 for slowly turning on and off the transistors 51 and 36.

In the position of the change-over switch in which the contact 70 engages the contact 71, the transistor 51 is kept in the conducting state. In this position of the change-over switch, a monaural signal can be derived from the output terminals when it is received. On the other hand, when a stereophonic signal the level of which is higher than the predetermined level is received in the above position of the change-over switch, the d.c. voltage appearing across the variable resistor 38 and the electrolytic capacitor 39 is utilized to urge the transistor 65 to conduct, hence to cut off the transistor 36. The 38-kHz switching carrier is generated thereby and the demodulating circuit is placed in the condition of stereo operation so that the stereophonic signal of the level higher than the predetermined input level can be derived from the output terminals. In the case of a stereophonic signal the level of which is lower than the predetermined input level, the transistor 65 is cut off and therefore the transistor 36 conducts so that the 38-kHz switching carrier is not generated and the stereophonic signal of the level lower than the predetermined input level is derived from the output terminals as a monaural signal.

Parts of the circuit shown in FIG. 1 may be modified in a manner as shown in FIGS. 2 to 5 to obtain a circuit which functions equally effectively. Like reference numerals are used throughout FIGS. 1 to 8 to denote like parts.

Figure 2:
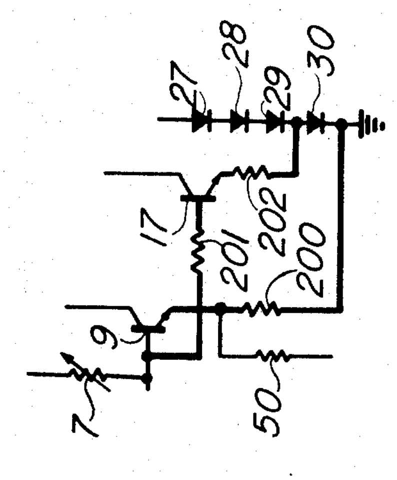

Referring to FIG. 2, the resistors 10, 11 and 18 in the circuit shown in FIG. 1 are replaced by resistors 200, 201 and 202, and these resistors are connected in a manner as shown.

Figure 3:
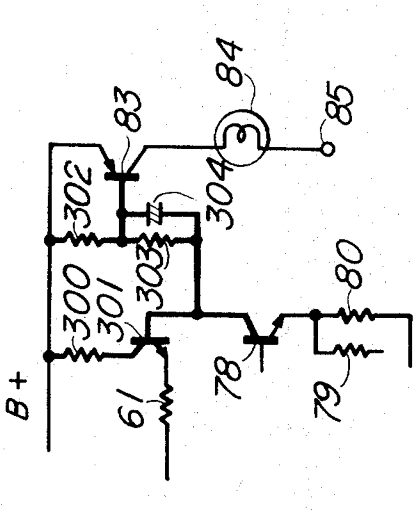

Referring to FIG. 3, the transistor 81, the resistors 74, 75, 77 and 82, and the electrolytic capacitor 76 in the circuit shown in FIG. 1 are replaced by a transistor 301, resistors 300, 302 and 303, and an electrolytic capacitor 304, and these elements are connected in a manner as shown.

Figure 4:
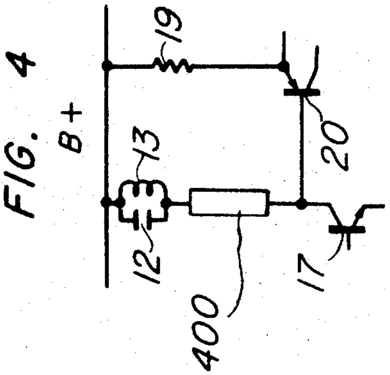
FIGS. 2 to 5 are circuit diagrams showing partial modifications of the circuit shown in FIG. 1.

Referring to FIG. 4, the diode 14 and the resistors 15 and 16 in the circuit shown in FIG. 1 are replaced by a means 400, and this means 400 is connected in a manner as shown.

Figure 5:
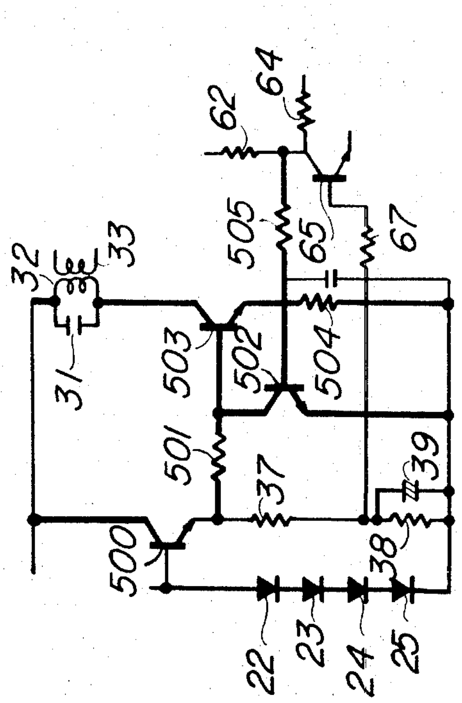

Referring to FIG. 5, the transistors 35 and 36 and the resistors 34 and 61 in the circuit shown in FIG. 1 are replaced by transistors 500, 502 and 503 and resistors 501, 504 and 505, and these elements are connected in a manner as shown. While various partial modifications are shown in FIGS. 2 to 5, two or more modifications among them may be simultaneously applied to the circuit shown in FIG. 1.

A first feature of the present invention resides in the facility of monaural muting and automatic monaural-stereophonic switch-over, and this is easily realized by the additional provision of the transistors 51 and 36. Any description as to this feature is unnecessary because it has already been described in detail in the foregoing.

A second feature of the present invention resides in the fact that the stereo lamp is energized as soon as the stereo operation is started but it is not lit in the absence of the stereo operation and the distortion of the audible monaural signal of relatively high frequencies is improved. This is realized by the additional provision of the shorting transistor 36 as shown in FIG. 1. The transistor 36 has its collector connected to the collector of the transistor 35 and its emitter connected to a point of constant voltage through the diodes 27 and 28.

When no stereophonic input signal is applied to the circuit or when stereophonic input signal applied to the circuit is still weak, no substantial d.c. voltage due to the pilot signal in the stereophonic signal appears across the resistor 38 and the electrolytic capacitor 39, and the transistor 65 remains in the cut-off state, hence the transistors 78 and 81 are cut off and the stereo lamp 84 is not energized. In this case, the transistor 36 is conducting. Since the emitter of the transistor 36 is connected to the point of constant voltage through the diodes 27 to 30, voltage is supplied to the collector of the transistor 35 through the transistor 36 so that, in a d.c. sense, a d.c. voltage can appear across the resistor 38 and the electrolytic capacitor 39 due to the pilot signal. In an a.c. sense, however, the 38-kHz switching carrier does not appear across the coil 32 and the capacitor 31 due to the fact that the transistor 36 is in the shorted state, and no stereo operation takes place in the demodulating circuit. It will be seen from the above description that the stereo lamp 84 is not lit when no stereo operation takes place in the demodulating circuit.

In response to the receiving of a stereophonic signal the level of which is higher than a predetermined input level, a d.c. voltage appears across the resistor 38 and the electrolytic capacitor 39 due to the pilot signal in the stereophonic signal thereby urging the transistor 65 to conduct so that the transistors 78 and 81 conduct and the stereo lamp 84 is lit. The stereo operation takes place in the demodulating circuit due to the fact that the transistor 36 is cut off and the 38-kHz switching carrier appears across the coil 32 and the capacitor 31 through the transistor 35. That is, the stereo lamp 84 is lit as soon as the stereo operation take place.

If the transistor 36 were not present, such trouble occurs in which the stereo lamp 84 is not lit in spite of the fact that the stereo operation actually takes place in the receiver which is set for the automatic monaural-stereophonic switch-over. More precisely, if the transistor 36 were not provided, the 38-kHz switching carrier appears across the coil 32 and the capacitor 31 through the transistor 35 in response to even a weak stereophonic input signal. Although the stereo operation takes place due to the fact that the transistor 51 is externally forcedly urged to conduct in the automatic monaural-stereophonic switch-over position of the receiver, the d.c. voltage appearing across the resistor 38 and the electrolytic capacitor 39 is quite low due to the weak stereophonic input signal and cannot urge the transistor 65 to conduct resulting in trouble that the stereo lamp 84 is not lit still at that time. The above trouble can be overcome by the provision of the transistor 36 which is one feature of the present invention. According to the present invention, the 38-kHz switching carrier is prevented from appearing across the coil 32 and the capacitor 31 when the stereo lamp 84 is not lit.

Another advantage of the provision of the transistor 36 resides in the improvement of the distortion of monaural audible signals of relatively high frequencies. If a monaural audible signal of relatively high frequencies is received by the receiver which is not provided with the transistor 36, a switching carrier appears across the coil 32 and the capacitor 31 through the transistor 35 resulting in a large distortion of the monaural signal. The addition of the transistor 36 can prevent the switching carrier from appearing across the coil 32 and the capacitor 31 for the same reason as that described above so that the distortion of the monaural signal can be sufficiently reduced.

Another arrangement may be employed for realizing the same function as that described above. This can be attained by an arrangement as shown in FIG. 5 in which a shorting transistor 502 has its collector connected to the base of a 38-kHz amplifying transistor 503 and its emitter connected to the negative terminal of the power supply. The output from the positive feedback amplifier circuit is applied to the base of the transistor 502 to turn on and off the transistor 502.

A third feature of the present invention relates to a system for improving the stereo separation. As shown in FIG. 1, the first composite signal of one phase is applied to the base of the transistor 46, while the second composite signal of opposite phase is applied to the base of the transistor 47, and the magnitude of the second composite signal is controlled to a suitable value by the variable resistor 8 for improving the stereo separation.

In a conventional demodulating circuit which includes two pairs of differential amplifier type of switching means, a first and a second composite signal amplifier connected in series with the respective pairs of switching means, and a resistor $r_3$ connected in series with either of emitter resistors $r_1$ and $r_2$ for the respective composite signal amplifiers, a switching transistor whose function is similar to that of the transistor 51 in the present invention cannot be connected in series with the resistor $r_3$. The operation of the conventional demodulating circuit has been such that the composite signal is applied solely to the base of one of the composite signal amplifiers and the composite signal of opposite phase for the cancellation of crosstalk signal components is derived from the other composite signal amplifier by the effect of the matrix circuit composed of the two composite signal amplifiers and the resistors $r_1$, $r_2$ and $r_3$. Connection of a switching transistor like the transistor 51 in the present invention in series with the resistor $r_3$ in the conventional demodulating circuit results in the disadvantage that satisfactory stereo separation cannot be obtained due to the fact that the magnitude of the internal resistance between the collector and emitter of the switching transistor is not negligible compared with the resistance of the resistor $r_3$ and the internal resistance is subject to fluctuation. The method for improving the stereo separation according to the third feature of the present invention can also effectively be applied to a circuit in which the transistor 51 is not provided and is short-circuited.

A fourth feature of the present invention resides in an arrangement in which the stereophonic input signal level at which the stereo operation takes place is not subject to a variation in spite of any variation in the power supply voltage or ambient temperature. Referring to FIG. 1, this is realized by dividing the forward voltage drop across the diode 14 by the resistors 15 and 16 and employing such a voltage as the base bias for the transistor 20 in the 19-kHz half-wave rectifying circuit. In contrast, prior practice has been such that a resistor is solely employed in place of the diode 14 and the resistors 15 and 16, and the voltage appearing across the resistor due to the collector current of the transistor 17 is utilized to apply the base bias for the transistor 20. It is common practice to determine the depth of the base bias for the transistor 20 so that the 38-kHz switching carrier can be sufficiently obtained through the half-wave rectifying circuit even with a small input and the effect of superposition of the composite signal on the 38-kHz switching carrier is negligible. The conventional system has been defective in that the stereophonic input signal level at which the stereo operation takes place is subject to a variation due to the fact that a variation in the power supply voltage results in a variation in the collector current of the transistor 17 and a corresponding variation in the magnitude of the voltage drop across the resistor, hence in a variation in the depth of the base bias for the transistor 20. The conventional system has further been defective in that a variation in the ambient temperature results in a variation in the contact potential difference between the emitter and base of the transistor 20 without any corresponding variation in the base bias for the transistor 20, hence in a variation in the stereophonic input signal level at which the stereo operation takes place.

On the other hand, according to the system of the present invention described above, no variation in the depth of the base bias for the transistor 20 occurs even with a variation in the collector current of the transistor 17 due to a variation in the power supply voltage, and therefore the stereophonic input signal level at which the stereo operation takes place is not subject to any variation. In other words, the application of the system according to the present invention provides the advantage in that the stereophonic input signal level at which the stereo operation takes place can be kept constant irrespective of the magnitude of the power supply voltage applied to the system. Further, a variation in the ambient temperature resulting in a variation in the magnitude of the contact potential difference between the emitter and base of the transistor 20 is followed by a corresponding variation in the magnitude of the forward voltage drop across the diode 14 so that the depth of the base bias for the transistor 20 can be prevented from an appreciable variation relative to the variation in the ambient temperature. Since, in this case, the forward voltage drop across the diode 14 is divided by the resistors 15 and 16, the variation in the forward voltage drop across the diode 14 due to the variation in the ambient temperature is divided by the resistors 15 and 16 with the result that the depth of the base bias for the transistor 20 is correspondingly subject to some variation depending on the temperature. However, the resistor 15 may have a large resistance and the resistor 16 may have a small resistance so that the voltage variation across the diode 14 due to the variation in the temperature can be substantially absorbed by the resistor 15 thereby minimizing the variation in the depth of the base bias for the transistor 20.

The present invention has another advantage in that the stereophonic input signal level at which the stereo operation takes place can be freely varied by varying the ratio of the resistance of the resistor 15 to the resistance of the resistor 16. That is, the stereo operation takes place at a low stereophonic input signal level by selecting a large resistance for the resistor 15 and a small resistance for the resistor 16, while it takes place at a high input signal level by selecting a small resistance for the resistor 15 and a large resistance for the resistor 16.

Referring to FIG. 4 showing another system according to the present invention, the diode 14 and the resistors 15 and 16 are replaced by a means 400 and this means 400 is utilized to apply the base bias for the transistor 20. The means 400 may be a combination of a metal and a semiconductor (for example, the metal may be of aluminum, molybdenum, etc. and the semiconductor of silicon or germanium) or a pair of semiconductors of different kinds having a contact potential difference which is slightly smaller than the contact potential difference between the emitter and base of the transistor 20. The means 400 may, for example, be a germanium diode when the transistor 20 is a silicon transistor. By the use of the means 400, the stereophonic input signal level at which the stereo operation takes place can be maintained constant irrespective of a variation in the power supply voltage or ambient temperature for the same reason as above described. The variation in the stereophonic input signal level at which the stereo operation takes place can be reduced compared with the systems described previously by suitably selecting the material of the means 400 depending on the material of the transistor 20.

A fifth feature of the present invention resides in an arrangement such that the stereo lamp is energized only when a stereophonic signal is received, while the stereo lamp is prevented from being energized in the detuned state in which large inter-station noises occur. In an FM receiver having a plurality of FM-IF stages, detuning results generally in abrupt appearance of large noises thereby causing such trouble that the stereo lamp is energized by the noises.

Figure 6:
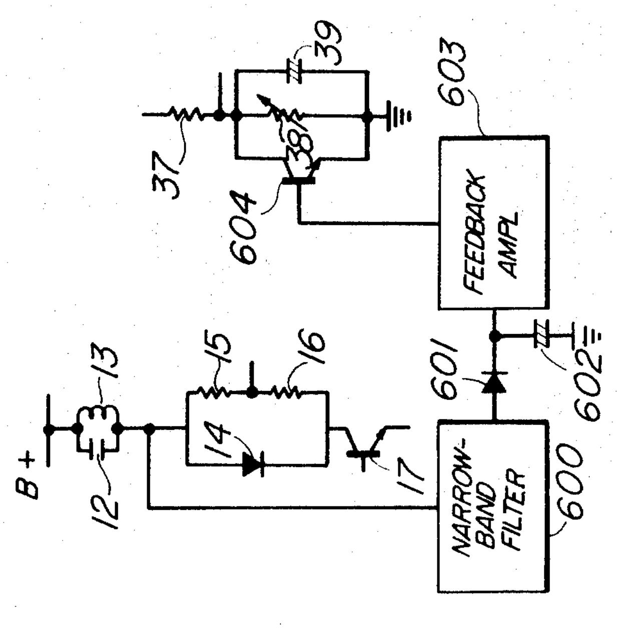

A first method for overcoming this defect is shown in FIG. 6. Referring to FIG. 6, the 19-kHz signal derived from one terminal of the 19-kHz tuner composed of the coil 13 and the capacitor 12 is applied through a 19-kHz narrow-band filter 600 and a diode 601 to a second positive feedback amplifier 603 which is driven into the on state or off state depending on the presence or absence of the 19-kHz signal. The output from the second positive feedback amplifier 603 is applied to a shorting transistor 604 disposed in parallel with the resistor 38 and the electrolytic capacitor 39. Thus, in the detuned state in which large inter-station noises occur, the second positive feedback amplifier 603 connected to the 19-kHz narrow-band filter 600 through the diode 601 is in the off state and the shorting transistor 604 conducts and is in the shorted state with the result that substantially zero d.c. voltage appears across the resistor 38 and the electrolytic capacitor 39 and the stereo lamp 84 cannot be energized. On the other hand when, the 19-kHz signal appears through the 19-kHz narrow-band filter 600 in response to the receiving of a stereophonic signal, the second positive feedback amplifier 603 is driven into the on state and the shorting transistor 604 is cut off with the result that a d.c. voltage appears across the resistor 38 and the electrolytic capacitor 39 to energize the stereo lamp 84.

Figure 7:
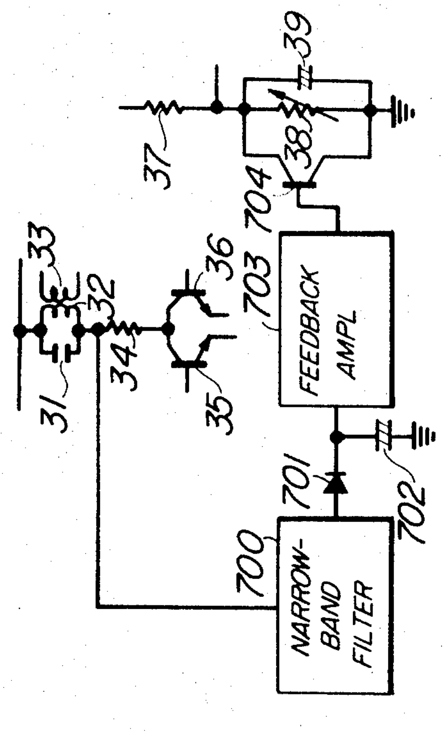
FIGS. 6 to 8 are circuit diagrams showing means for preventing the stereo lamp from being energized due to large inter-station noises appearing in the detuned state.

A second method for overcoming the defect is shown in FIG. 7. Referring to FIG. 7, the 38-kHz signal derived from one terminal of the 38-kHz tuner composed of the coil 32 and the capacitor 31 is applied through a 38-kHz narrow-band filter 700 and a diode 701 to a third positive feedback amplifier 703 which is driven into the on state or off state depending on the presence or absence of the 38-kHz signal. The output from the third positive feedback amplifier 703 is applied to a shorting transistor 704 disposed in parallel with the resistor 38 and the electrolytic capacitor 39. The opration of this circuit is similar to that of the circuit shown in FIG. 6.

Figure 8:
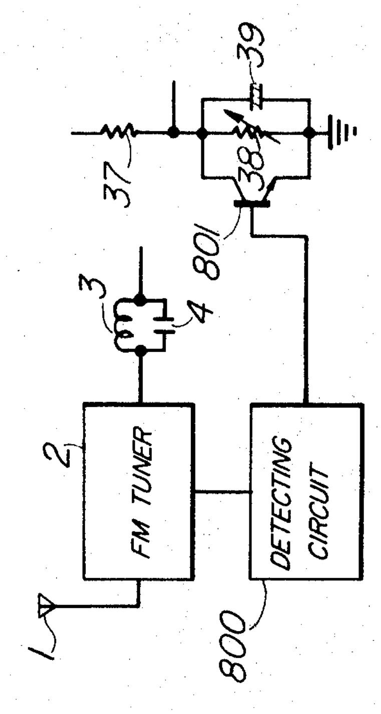

A third method for overcoming the defect is shown in FIG. 8. Referring to FIG. 8, the output from a detecting circuit 800 connected to the IF circuit for detecting the presence or absence of the signal is applied to a shorting transistor 801 disposed in parallel with the resistor 38 and the electrolytic capacitor 39. By the action of the detecting circuit 800, the shorting transistor 801 is turned off in the tuned state and on in the detuned state. In the detuned state in which large inter-station noises occur, substantially zero d.c. voltage appears across the resistor 38 and the electrolytic capacitor 39 due to the shorting of the shorting transistor 801 and therefore the stereo lamp 84 is not energized. On the other hand, in the tuned state, the transistor 801 is cut off and a d.c. voltage appears across the resistor 38 and the electrolytic capacitor 39 to energize the stereo lamp 84.

What is claimed is:

1. An FM stereo receiver for a stereophonic composite signal including a pilot signal, comprising: generating means for generating a D.C. voltage in response to the pilot signal; a single positive feedback amplifier connected to said generating means and triggered into one of operative and inoperative states by the generated D.C. voltage; demodulating means for synchronously demodulating the stereophonic composite signal comprising two pairs of differential amplifier type switch circuits, each pair was connected in series with first and second composite signal amplifying transistors, respectively, at least one of which is supplied with the stereophonic composite signal; a third transistor connected in series with either of said first and second transistors, further switching means for switching said third transistor into an ON state in response to a first output of said positive feedback amplifier in the presence of a generated D.C. voltage higher than a predetermined reference level and for switching said third transistor into an OFF state in response to a second output of said positive feedback amplifier in the presence of a generated D.C. voltage lower than said predetermined reference level in order to effect monaural muting operation and to squelch a received stereophonic composite signal having less than a predetermined input level; and audio output means connected to said demodulating means for deriving an audio output from said demodulating means when said D.C. voltage is higher than said predetermined reference level.

2. An FM stereo receiver according to claim 1, further comprising separating means for separating the stereophonic composite signal to apply separated composite signals having an opposite phase relationship to each other to the bases of said first and second transistors, respectively, and level changing means for changing the input level of one of said first and second transistors to adjust the separation of the separated signals.

3. An FM stereo receiver according to claim 1, wherein said demodulating means comprises a 38 KHz switching signal generating circuit including a fourth transistor for amplifying a 38 KHz switching carrier and a fifth shorting transistor connected to the base circuit of said fourth transistor for controlling generation of the switching carrier by controlling said fifth transistor in response to said feedback amplifier means.

4. An FM stereo receiver according to claim 1, further comprising a capacitor or capacitor-resistor timing circuit connected to the base of said third transistor for slow operation thereof.

5. An FM stereo receiver according to claim 3, further comprising a capacitor or capacitor-resistor timing circuit connected to the base of said fifth transistor for slow operation thereof.

6. An FM stereo receiver according to claim 1, further comprising a fourth transistor parallelly connected with the input of said feedback amplifier, and detecting means for detecting the absence and presence of a tuned broadcast signal from an IF circuit to urge said fourth transistor on and off, respectively, whereby said feedback amplifier is switched into an operative state by the D.C. voltage of said generating means only when a stereophonic broadcast signal is received and said amplifier means is switched into an inoperative state by the absence of a tuned signal detected by said detecting means.

7. An FM stereo receiver according to claim 1, further comprising: a fourth transistor parallelly connected with the input of said feedback amplifier a second positive feedback amplifier connected through a pilot signal passing narrow band filter to a pilot signal detector of said generating means, said second amplifier being switched into one of operative and inoperative states in response to the presence and absence, respectively, of a detected pilot signal in order to urge said fourth transistor off and on, respectively; a stereo indicator lamp means which is switched into an operative state by the presence of a detected pilot signal and which is switched into an inoperative state in a detuned state of the receiver where large interstation noises occur.

8. An FM stereo receiver according to claim 1, further comprising a shorting transistor parallelly connected with the input of said feedback amplifier; a second positive feedback amplifier connected through a 38KHz passing narrow band filter to a 38KHz subcarrier generating circuit of said demodulating means, said second amplifier being switched into one of operative and inoperative states in response to the presence and absence, respectively, of a 38KHz subcarrier from said generating means in order to urge said shorting transistor off and on, respectively; and stereo indicator lamp means which is switched into an operative state when a stereophonic broadcast is received and which is switched into an inoperative state in a detuned state of the receiver where large interstation noises occur.

9. An FM stereo receiver according to claim 1, further comprising a fixed bias circuit and third switching means coupled between said bias circuit and the base of said third transistor, said third switching means having first and second positions in which said bias circuit is connected to and disconnected from, respectively, the base of said third transistor, wherein in the first position of said third switching means said demodulating means is maintained in an operative state for producing a monaural output signal from said audio output means when a monaural audio signal is received and for producing separated stereo output signals from said audio output means when a stereophonic composite signal is received and wherein in said second position of said third switching means no monaural output signal is derived from said audio output means when a monaural audio signal is received.

10. An FM stereo receiver according to claim 1, wherein said demodulating means comprises a switching signal producing circuit for producing switching signals for synchronous demodulation, including a fourth transistor for amplifying a 38KHz carrier; and further comprising a fifth shorting transistor connected to and driven by said positive feedback amplifier means and connected in parallel with said fourth transistor, said fifth transistor being switched into an ON state to short out said fourth transistor in response to said second output of said positive feedback amplifier and being switched into an OFF state for deriving said 38KHz carrier from said fourth transistor in response to said first output of said positive feedback amplifier.

11. An FM stereo receiver according to claim 9, further comprising a 38KHz switching signal producing circuit and a stereo indicator driving circuit for driving means to indicate reception of a stereo signal, said 38KHz switching signal producing circuit, said stereo indicator driving circuit and said third transistor all being controlled by the output of said positive feedback amplifier, wherein when said third switching means is in its second position and said positive feedback amplifier is switched to an OFF state upon reception of a monaural signal or a stereo signal having a signal level below a predetermined input level, said switching signal producing circuit, said indicator driving circuit and said third transistor are switched to OFF states, wherein when said third switching means is in said second position and said positive feedback amplifier is switched to an ON state in response to reception of a stereo signal having a signal level above said predetermined input level, said switching signal producing circuit, said driving circuit and said third transistor are switched into ON states, and wherein when said third switching means is in its first position and said positive feedback amplifier is switched into its OFF state in response to reception of monaural signals and stereo signals having a signal level below said predetermined input level, said switching signal producing circuit and indicator driving circuit are held in said OFF states and a monaural output is provided by said audio output means in response to a monaural input, and wherein when said third switching means is in its first position and said positive feedback amplifier is switched into its ON state in response to reception of a stereo input signal having a signal level above said predetermined input level, said switching signal producing circuit and indicator driving circuit are switched into their ON states and a separated stereo output is provided from said audio output means.

12. An FM stereo receiver according to claim 1, comprising a transistor circuit for half-wave rectification of the 19KHz pilot signal for producing 38KHz switching carrier, and means for imparting a base bias to said transistor circuit less than a potential difference between emitter and base electrodes of said transistor circuit, including diode means having a similar temperature-voltage characteristic to that of the base-emitter voltage and having a nearly constant voltage thereacross irrespective of variations in current flowing therethrough, or including a combination of a metal and a semiconductor or a combination of different semiconductors.

13. An FM stereo receiver according to claim 10, further comprising a capacitor or capacitor-resistor timing circuit connected to said fifth transistor for slow operation thereof.

14. An FM stereo receiver for receiving a monaural signal and a stereophonic signal which includes a 19KHz pilot signal, comprising:

a first amplifying stage for amplifying a composite signal;

a second amplifying stage connected to said first amplifying stage for amplifying and half-wave rectifying said pilot signal, including first transistor means for amplifying said pilot signal and second transistor means connected to said first transistor means for half-wave rectifying said pilot signal;

constant bias means for supplying a constant bias voltage to said second stage;

generating means connected to the output of said second amplifying stage for generating a 38KHz switching carrier signal when a predetermined D.C. voltage level component of the rectified pilot signal appears at the output of said second stage;

a positive feedback amplifying stage, including a positive feedback amplifier connected to an output of said generating means, which is switched into one of on and off states in accordance with the presence and absence, respectively, of a minimum D.C. voltage level at the output of said generating means;

demodulation means for synchronously demodulating said stereo signal, including two pairs of differential amplifier on-off means, respectively connected in series with first and second composite signal amplifiers;

switching means connected in series with both of said first and second composite signal amplifiers, said switching means being switched between on and off states in response to said positive feedback amplifier means in order to demodulate a received stereophonic composite signal above a predetermined level by said demodulation means, and effect monaural muting operation and to squelch a received stereophonic composite signal having less than said predetermined input level respectively;

constant level means for maintaining a substantially constant stereo-on level irrespective of variations in power supply current through the collector of said first transistor means and variations in the contact potential difference across a p-n junction of said second transistor means;

indicating means for indicating reception of a stereo signal by the receiver;

energizing means connected to said feedback amplifying means for energizing said indicating means and said generating means; and signal supplying means connected between said first amplifying stage and said demodulation means for applying a first composite signal to said first composite signal amplifier and a second composite signal of opposite phase from said first signal to said second composite signal amplifying means, said signal applying means including level varying means for varying the level of the signal applied to said second composite signal amplifying means for adjusting stereo separation.

15. An FM stereo receiver according to claim 14, wherein:

said generating means comprises third transistor means for amplifying said 38 KHz switching carrier signal, said third transistor means having a first output from which said 38 KHz signal is obtained and a second output from which said D.C. voltage level component of said pilot signal is obtained;

said indicating means comprises an indicating lamp connected to a lamp driver transistor; and said energizing means comprises fourth transistor means connected to said third transistor means for shorting said third transistor means;

wherein the output of said positive feedback amplifying means is applied to said fourth transistor means and said driver transistor to energize said indicating lamp when a stereo signal is received by said receiver and to de-energize said indicating lamp when no stereo signal is received.

16. An FM stereo receiver according to claim 14, wherein:

said indicating means comprises an indicating lamp connected to a lamp driver transistor; and said generating means comprises third transistor means for amplifying said 38 KHz switching carrier signal and fourth transistor means connected to the base of said third transistor means for shorting said third transistor means, wherein the output of said positive feedback amplifying means is applied to said fourth transistor means and to said lamp driver transistor to energize said lamp when a stereo signal is received by said receiver.

17. An FM stereo receiver as claimed in claim 16, in which a capacitor or a CR time constant circuit is disposed in the base circuit of said fourth transistor so as to slowly turn on and off said fourth transistor.

18. An FM stereo receiver as claimed in claim 17, in which a capacitor or a CR time constant circuit is disposed in the base circuit of said fourth transistor so as to slowly turn on and off said fourth transistor.

* * * * *